United States Patent

Ibuki et al.

(10) Patent No.: US 10,008,964 B2
(45) Date of Patent: Jun. 26, 2018

(54) MOTOR CONTROL DEVICE AND GAME MACHINE

(71) Applicant: OMRON Corporation, Kyoto-shi, Kyoto (JP)

(72) Inventors: Hiroyuki Ibuki, Ichinomiya (JP); Akihiro Ishii, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days. days.

(21) Appl. No.: 15/628,366

(22) Filed: Jun. 20, 2017

(65) Prior Publication Data

US 2018/0013362 A1    Jan. 11, 2018

(30) Foreign Application Priority Data

Jul. 8, 2016    (JP) ................................. 2016-135885

(51) Int. Cl.
| | |
|---|---|
| *H02K 7/10* | (2006.01) |
| *H02K 17/32* | (2006.01) |
| *H02K 23/68* | (2006.01) |
| *H02P 7/03* | (2016.01) |
| *H02P 7/00* | (2016.01) |
| *H02P 6/16* | (2016.01) |
| *A63F 7/02* | (2006.01) |
| *G07F 17/32* | (2006.01) |

(52) U.S. Cl.
CPC .................. *H02P 7/03* (2016.02); *A63F 7/02* (2013.01); *G07F 17/32* (2013.01); *H02P 6/16* (2013.01); *H02P 7/0094* (2013.01); *H02P 2203/03* (2013.01)

(58) Field of Classification Search
CPC ..................................... H02P 7/03; A63F 7/02
USPC .......................................................... 318/268
See application file for complete search history.

(56) References Cited

U.S. PATENT DOCUMENTS

| | | | |
|---|---|---|---|
| 2009/0227353 A1* | 9/2009 | Yoshizawa | .......... G07F 17/3265 463/20 |
| 2011/0089874 A1 | 4/2011 | Shimizu | |
| 2015/0073745 A1* | 3/2015 | Mizuno | ..................... G01P 3/44 702/147 |

(Continued)

FOREIGN PATENT DOCUMENTS

| | | |
|---|---|---|
| JP | 2011-87440 A | 4/2011 |
| JP | 2014-73024 A | 4/2014 |

*Primary Examiner* — Erick Glass
(74) *Attorney, Agent, or Firm* — Metrolexis Law Group, PLLC (57) ABSTRACT

A motor control device includes: a communication interface receiving from an external device a control command for defining a target rotation amount and a target rotation speed of the motor; a sensor interface connected with a first rotation angle sensor outputting a first detection signal in every rotation of the motor at a first angle or a second rotation angle sensor outputting a second detection signal in every rotation of the motor at a second angle larger than the first angle; a controller obtaining a measured value of a rotation speed of the motor based on a reception interval of the first or second detection signal, to decide a set value of the rotation speed to bring the measured value close to the target rotation speed; and a drive signal generator generating a drive signal for rotating the motor according to the set value, and outputting the drive signal.

8 Claims, 7 Drawing Sheets (56) References Cited

U.S. PATENT DOCUMENTS

2015/0227125 A1\* 8/2015 Matsushita ........... H02P 7/2805
273/460

\* cited by examiner

| Operation | TR1 | TR2 | TR3 | TR4 |
|---|---|---|---|---|
| Forward rotation, drive | ON | OFF | OFF | ON |
| Forward rotation, stop | OFF | OFF | OFF | OFF |
| Backward rotation, drive | OFF | ON | ON | OFF |
| Backward rotation, stop | OFF | OFF | OFF | OFF |
| Brake | OFF | OFF | ON | ON |

| Speed | Number of clocks |
|---|---|
| 16 | 75 |
| 15 | 80 |
| 14 | 85 |
| 13 | 92 |
| 12 | 100 |
| 11 | 109 |
| 10 | 120 |
| 9 | 133 |
| 8 | 150 |
| 7 | 171 |
| 6 | 200 |
| 5 | 240 |
| 4 | 300 |
| 3 | 400 |
| 2 | 600 |
| 1 | 1200 |
| 0 | N/A |

MOTOR CONTROL DEVICE AND GAME MACHINE

CROSS-REFERENCE TO RELATED APPLICATION

This application is based on Japanese Patent Application No. 2016-135885 filed with the Japan Patent Office on Jul. 8, 2016, the entire contents of which are incorporated herein by reference.

FIELD

The disclosure relates to a motor control device for controlling a motor, and a game machine having such a motor control device.

BACKGROUND

Game machines, such as a slot game machine and a pinball game machine, have been devised to perform presentation that arouses the player's visual sense, auditory sense, or feeling so as to enhance the player's interest. Especially for performing presentation that arouses the player's visual sense, a movable body, such as a movable accessory, may be provided in the game machine. A motor is used for driving such a movable body. For moving the movable body by a predetermined moving amount at a predetermined speed in accordance with the presentation, a motor control device is used, for example. The motor control device receives a control command including a target speed and a target rotation amount from an upper-level device, for example, and controls the motor in accordance with the command.

In order to enhance the player's interest, a large-sized movable accessory may be mounted in the game machine. Driving such a movable accessory requires a motor having high torque. There may thus be used a direct current (DC) motor that is cheaper than a stepping motor, and is smaller in size than the stepping motor to exert the same torque. In this case, along with the DC motor, a rotation angle sensor is used which outputs a detection signal in every rotation of the DC motor at a predetermined angle. The motor control device counts the number of times it has received a detection signal from the rotation angle sensor, and can thereby determine whether or not the moving amount of the movable body has reached the predetermined moving amount. When the moving amount reaches the predetermined moving amount, the motor control device stops the rotation of the DC motor.

A technique of using a Hall sensor provided in the motor as the rotation angle sensor has been proposed (e.g., see Japanese Patent Application No. 2011-87440). Further, a technique of using a rotary encoder as the rotation angle sensor has been proposed (e.g., see Japanese Patent Application No. 2014-73024).

For precisely detecting the position of the movable body that is driven by the motor, it is preferable to use the rotary encoder that can make angular resolving power relatively high. Meanwhile, since the rotary encoder has a disk-like component fitted to a rotary shaft of the motor, the use of the rotary encoder requires a relatively large space on a plane orthogonal to the rotary shaft of the motor. However, it may be difficult to ensure such a space, depending on the game machine. In such a case, as the rotation angle sensor, a Hall sensor built in the motor is preferably used.

As thus described, a preferable type of rotation angle sensor may vary depending on the device installed with the motor and the motor control device. Further, in recent years, the reuse of a substrate mounted with the motor control device has been considered. In this case, there can be a difference in type of rotation angle sensor to be used before and after the reuse. Hence, the motor control device is preferably usable with respect to a plurality of different types of rotation angle sensors.

SUMMARY

Accordingly, it is an object of an embodiment of the present invention to provide a motor control device usable with respect to different types of rotation angle sensors.

As one aspect of the present invention, a motor control device for controlling a motor is provided. This motor control device may include: a communication interface configured to receive from an external device a control command for defining a target rotation amount and a target rotation speed of the motor; a sensor interface configured to be connected with any of a first rotation angle sensor for outputting a first detection signal in every rotation of the motor at a first angle and a second rotation angle sensor for outputting a second detection signal in every rotation of the motor at a second angle that is larger than the first angle; a controller configured to obtain a measured value of a rotation speed of the motor based on a reception interval of first detection signals or a reception interval of second detection signals, and configured to decide a set value of the rotation speed of the motor so as to bring the measured value close to the target rotation speed; and a drive signal generator configured to generate a drive signal for rotating the motor in accordance with the set value of the rotation speed, and configured to output the drive signal.

In this motor control device, there may be further included a terminal configured to be inputted with a signal representing which of the first rotation angle sensor and the second rotation angle sensor is to be connected. It may be preferable that the controller obtains a measured value of the rotation speed based on the reception interval of the first detection signals when the signal shows that the first rotation angle sensor is to be connected, while the controller obtains a measured value of the rotation speed based on the reception interval of the second detection signals when the signal shows that the second rotation angle sensor is to be connected.

Further, in this motor control device, in the case of obtaining the measured value of the rotation speed based on the second detection signal, it may be preferable that the controller changes the reception interval of the first detection signal corresponding to each individual rotation speed in a speed measurement table, which represents a relation between the reception interval of the first detection signals and the rotation speed of the motor, in accordance with the reception interval of the second detection signals at a predetermined rotation speed to correct the speed measurement table, and obtains the measured value of the rotation speed based on the corrected speed measurement table and the reception interval of the second detection signals.

Moreover, in this motor control device, it may be preferable that the sensor interface receives both the first detection signal and the second detection signal. In this case, it may be preferable that the controller obtains the measured value based on the reception interval of the first detection signals when the measured value is estimated to be not higher than a predetermined speed in accordance with the target rotation speed or an index representing the measured value of the rotation speed of the motor, while the controller obtains the measured value of the rotation speed of the motor based on the reception interval of the second detection signals when the measured value of the rotation speed of the motor is estimated to be higher than the predetermined speed.

According to another aspect, there is provided a game machine that may include: a game machine body, a movable body movably disposed on a front surface of the game machine body; a motor configured to drive the movable body; a rotation angle sensor that is any one of a first rotation angle sensor for outputting a first detection signal in every rotation of the motor at a first angle and a second rotation angle sensor for outputting a second detection signal in every rotation of the motor at a second angle that is larger than the first angle; a motor control device configured to control the motor; and a presentation controller configured to control presentation in accordance with a state of a game. In this game machine, the presentation controller may generate a control command for defining a target rotation amount and a target rotation speed of the motor in accordance with the state of the game, and transmits the control command to the motor control device. The motor control device may be any one of the above motor control devices.

The motor control device according to an embodiment of the present invention may exert the effect of being usable with respect to different types of rotation angle sensors.

DETAILED DESCRIPTION

Hereinafter, a motor control device according to one embodiment of the present invention will be described with reference to the drawings. When this motor control device receives from an upper-level control device a control command including control information for defining operation of a motor, such as a target rotation amount and a target rotation speed of the motor, the motor control device controls the motor in accordance with the control information. At that time, based on a detection signal from the rotation angle sensor provided for detecting the rotation amount of the motor, this motor control device measures an actual rotation speed and rotation amount of the motor. In accordance with a result of the measurement, the motor control device brings the rotation speed of the motor close to the target rotation speed, and determines whether or not the rotation amount of the motor has reached the target rotation amount. Further, this motor control device is usable with respect to the rotary encoder and the Hall sensor built in the motor, as the rotation angle sensor, and sets the rotation angle sensor to be used out of the rotary encoder and the Hall sensor in accordance with an externally inputted switch signal.

In the embodiment, the motor being a controlled object of the motor control device is a DC motor. However, the motor being the controlled object of the motor control device is not restricted to the DC motor, and may be any of various types of motors with rotation amounts and rotation speeds detected by the rotation angle sensor.

Figure 1:
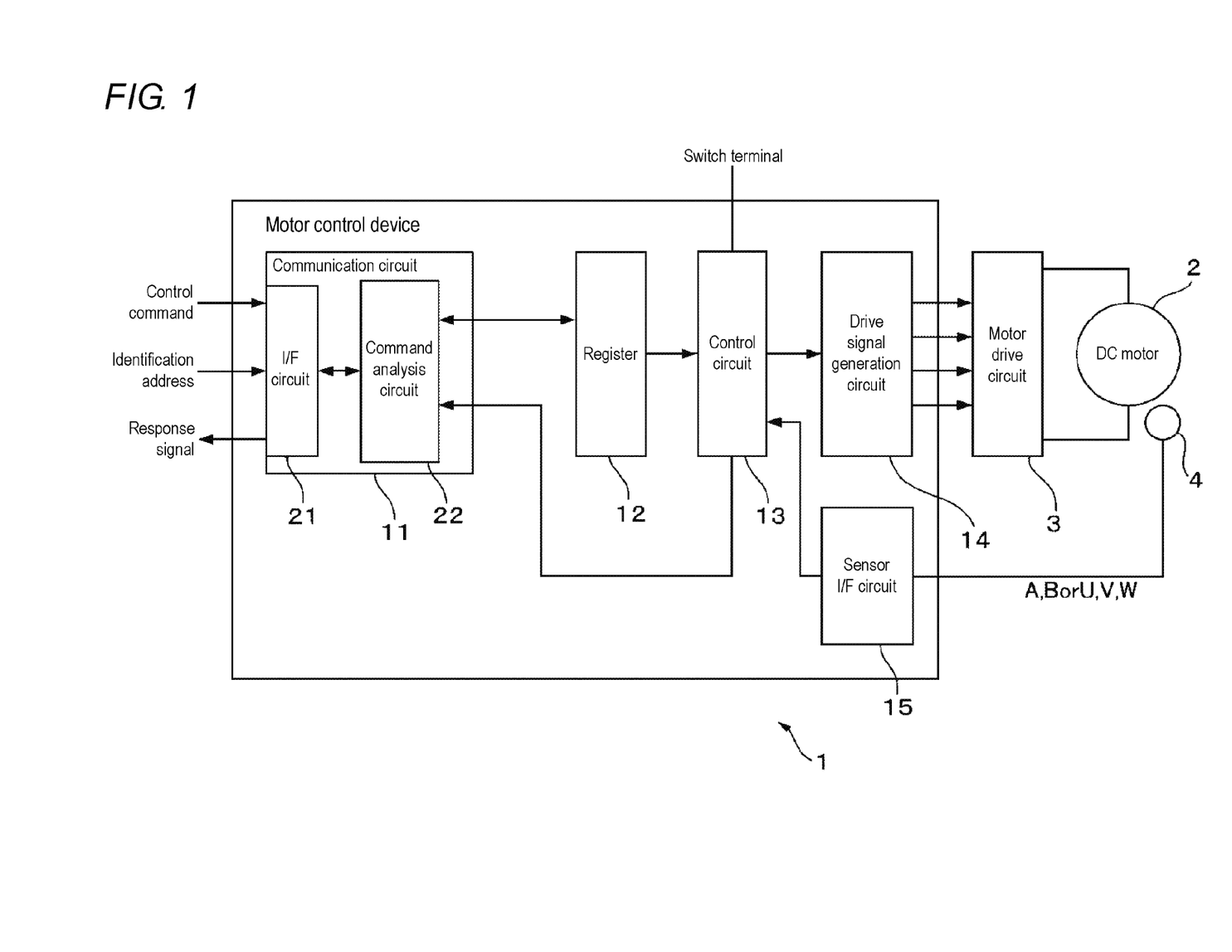
FIG. 1 is a schematic configuration diagram of a motor control device according to one embodiment of the present invention.

FIG. 1 is a schematic configuration diagram of a motor control device according to one embodiment of the present invention. As illustrated in FIG. 1, a motor control device 1 includes a communication circuit 11, a register 12, a control circuit 13, a drive signal generation circuit 14, and a sensor interface circuit 15.

Each of these units included in the motor control device 1 may be mounted on a circuit board (not illustrated) as a separate circuit, or may be mounted on the circuit board as an integrated circuit where these units are integrated.

The motor control device 1 controls a DC motor 2 in accordance with a control command received from an upper-level control device. Specifically, the motor control device 1 rotates the DC motor 2 at a target rotation speed specified by the control command. In the embodiment, the motor control device 1 is generated according to a pulse width modulation (PWM) technique, and controls a rotation speed of the DC motor 2 by outputting a drive signal to a motor drive circuit 3 for supplying a current to the DC motor 2, the drive signal switching the on and off of supply of a current to the DC motor 2. In every rotation of a rotary shaft (not illustrated) of the DC motor 2 at a predetermined angle, the motor control device 1 receives from a rotation angle sensor 4 a detection signal showing that the rotary shaft has rotated at the predetermined angle. The motor control device 1 then calculates a total rotation amount from the start of execution of the control command. The motor control device 1 then stops the DC motor 2 at the time when the total rotation amount reaches the target rotation amount specified by the control command. Further, based on a reception interval of detection signals from the rotation angle sensor 4, the motor control device 1 measures an actual rotation speed of the DC motor 2, and controls the DC motor 2 so as to bring the actual rotation speed close to the target rotation speed.

Figure 2:
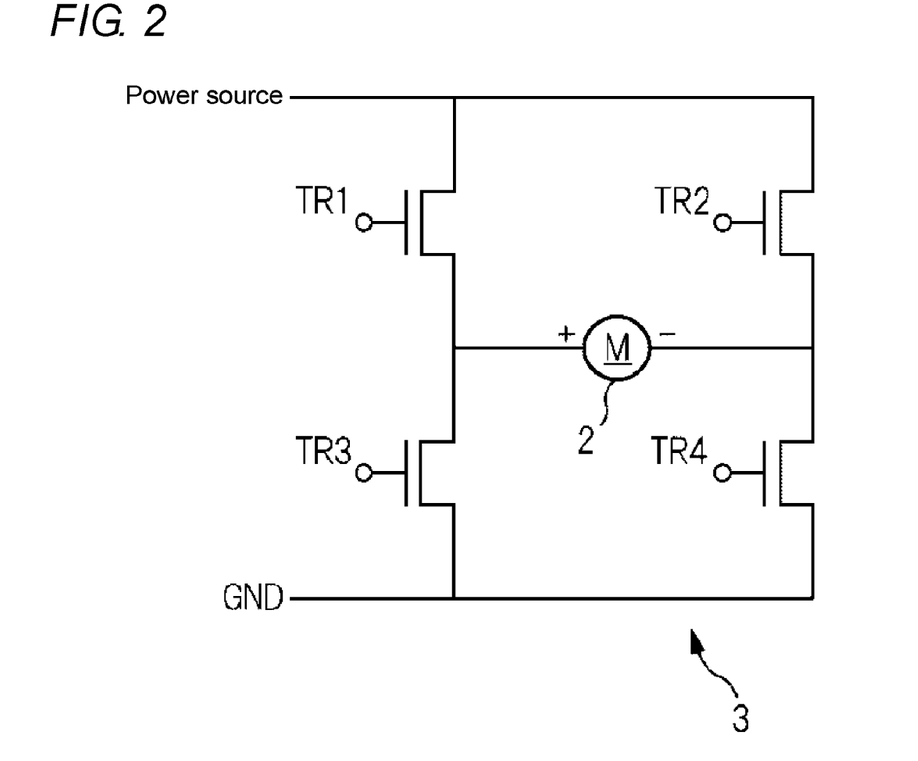
FIG. 2 is a circuit diagram of a motor drive circuit.

FIG. 2 is a circuit diagram of the motor drive circuit 3. The motor drive circuit 3 has four switches TR1 to TR4. Note that each switch can be a transistor or a field-effect transistor, for example. Among the switches, two switches TR1 and TR3 are connected in series between a power source and a ground. Similarly, two switches TR2 and TR4 are connected in series between the power source and the ground. A positive side terminal of the DC motor 2 is connected between the switches TR1 and TR3, while a negative side terminal of the DC motor 2 is connected between the switches TR2 and TR4. A switch terminal of each of the switches TR1 to TR4 (e.g., when the switches TR1 to TR4 are transistors, the switch terminal corresponds to a base terminal, and when the switches TR1 to TR4 are field-effect transistors, the switch terminal corresponds to a gate terminal) is connected to the drive signal generation circuit 14. A drive signal from the drive signal generation circuit 14 is inputted into the switch terminal of each of the switches TR1 to TR4.

Figure 3:
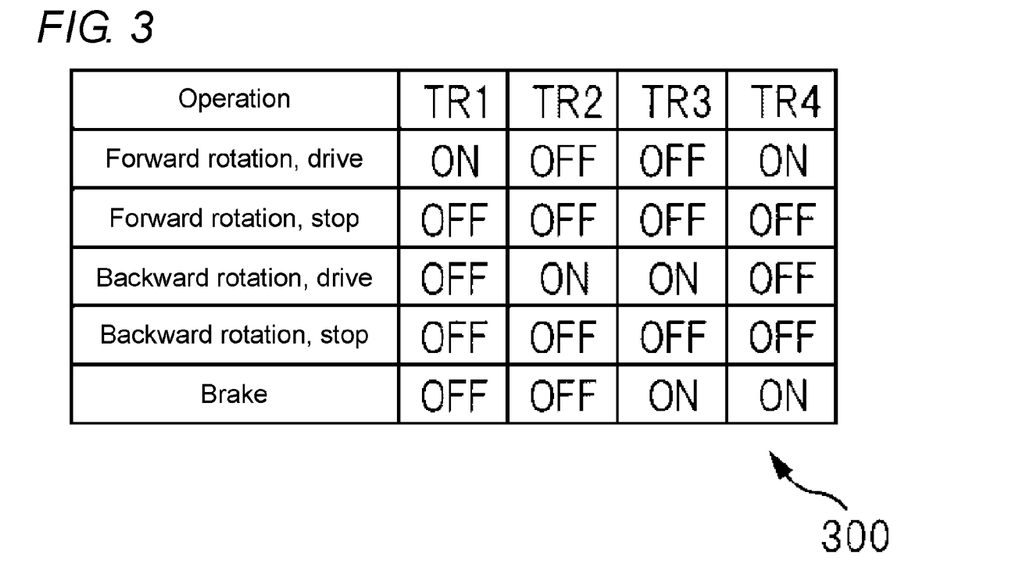
FIG. 3 is a diagram illustrating an example of a table that represents a relation between a drive signal applied to each switch of the motor drive circuit and a rotation direction of a DC motor.

FIG. 3 is a diagram illustrating an example of a table that represents the relation between the drive signal applied to each switch and the rotation direction of the DC motor 2.

As shown in Table 300, when the DC motor 2 is rotated forward, a drive signal is applied to the switch terminal of the switch TR1 and the switch terminal of the switch TR4, the drive signal having been set according to the PWM technique and including a periodical pulse that has a pulse width in accordance with the rotation speed of the DC motor 2. Meanwhile, the drive signal is not applied to the switch terminal of the switch TR2 or the switch terminal of the switch TR3. Thus, since a source voltage is applied to the positive side terminal of the DC motor 2 only during application of a pulse to each of the switches TR1 and TR4, the DC motor 2 rotates forward at a speed in accordance with a pulse width of the applied pulse. When the DC motor 2 is to be rotated forward, the drive signal may be applied to either the switch TR1 or TR4 and the other switch may be kept always on.

On the other hand, when the DC motor 2 is rotated backward, a drive signal is applied to the switch terminal of the switch TR2 and the switch terminal of the switch TR3, the drive signal having been set according to the PWM technique and including a periodical pulse in accordance with the rotation speed of the DC motor 2. Meanwhile, the drive signal is not applied to the switch terminal of the switch TR1 or the switch terminal of the switch TR4. Thus, since a source voltage is applied to the negative side terminal of the DC motor 2 only during application of a pulse to the switch TR2 and the switch TR3, the DC motor 2 rotates backward at a speed in accordance with a pulse width of the applied pulse.

When the DC motor 2 is to be rotated backward, the drive signal may be applied to either the switch TR2 or TR3 and the other switch may be kept always on.

When a brake is to be put on the DC motor 2, the switch terminal of the switch TR3 and the switch terminal of the switch TR4 are turned on, and the switch terminal of the switch TR1 and the switch terminal of the switch TR2 are turned off.

When the DC motor 2 is not to be driven, the switch terminal of each switch is turned off.

The rotation angle sensor 4 can, for example, be an optical type rotary encoder or a Hall sensor built in the DC motor 2.

Figure 4A:
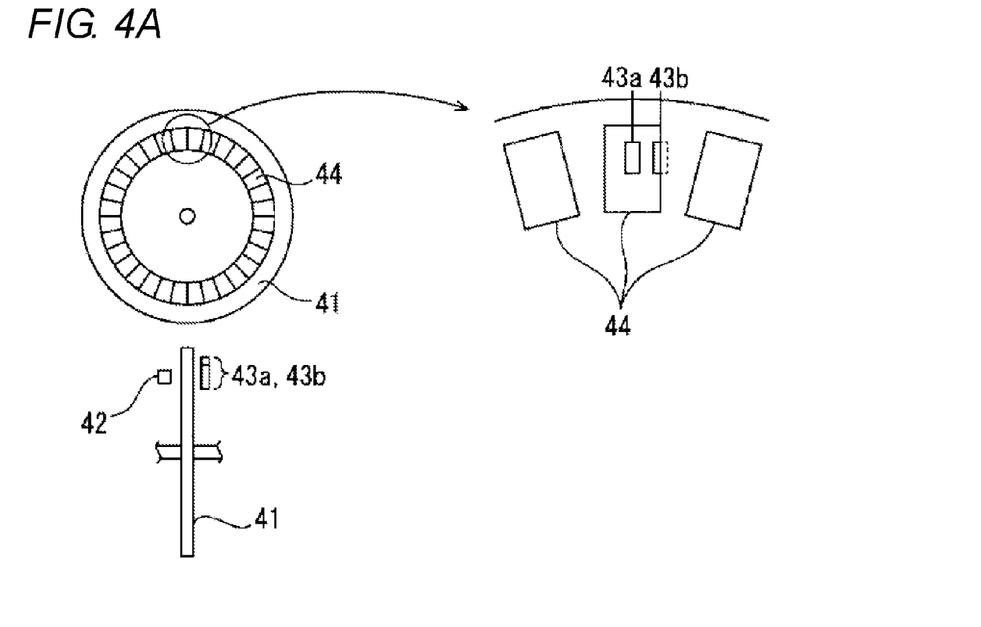
FIG. 4A is a schematic configuration view of a rotary encoder that is an example of the rotation angle sensor.

FIG. 4A is a schematic configuration view of the rotary encoder that is an example of the rotation angle sensor 4. In this case, the rotation angle sensor 4 includes, for example, a disk 41 fitted to the rotary shaft of the DC motor 2, and a light source 42 and two light receiving elements 43a, 43b which are disposed so as to be opposed to each other with the disk 41 placed therebetween. A plurality of slits 44 are formed on the disk 41 along a direction of a circumference centered at its rotary shaft. Every time any of the slits 44 is located between the light source 42 and the light receiving elements 43a, 43b, light from the light source 42 reaches the light receiving elements 43a, 43b, and the light receiving elements 43a, 43b each output a pulse-shaped detection signal. Thus, the rotation angle sensor 4 outputs a detection signal in every rotation of the DC motor 2 at a predetermined angle. For example, when 250 slits 44 are provided in the circumferential direction, 1000 detection signals are outputted every time the rotary shaft of the DC motor 2 turns around once. Further, the light receiving element 43a and the light receiving element 43b are disposed at a predetermined interval smaller than an interval between two adjacent slits 44 along the direction of the circumference centered at the rotary shaft of the disk 41.

When the rotation angle sensor 4 is the rotary encoder, a detection signal from the light receiving element 43a (hereinafter referred to as an A-phase detection signal) and a detection signal from the light receiving element 43b (hereinafter referred to as a B-phase detection signal) are outputted to the motor control device 1.

Figure 4B:
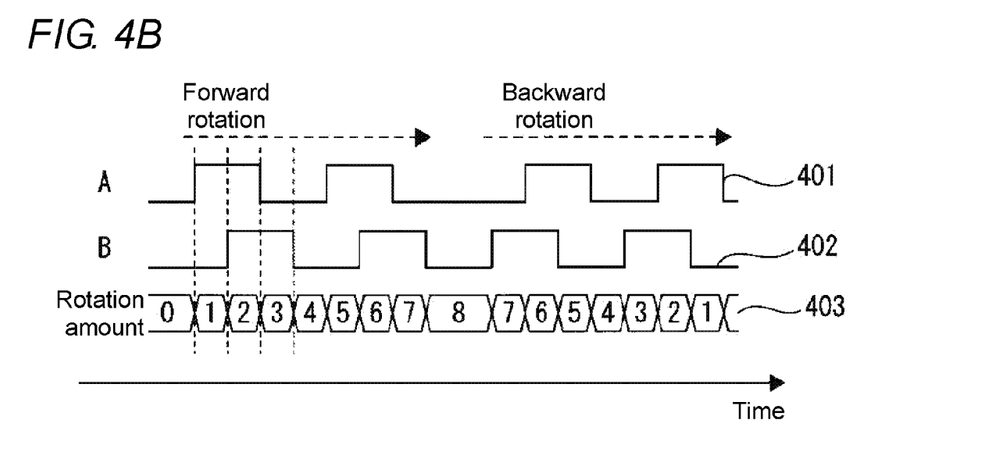
FIG. 4B is a timing chart for a detection signal outputted from the rotary encoder.

FIG. 4B is a timing chart for a detection signal outputted from the rotary encoder. In FIG. 4B, a horizontal axis represents time. Graphs 401 and 402 represent outputs from the light receiving elements 43a, 43b, respectively. A graph 403 represents a rotation amount of the DC motor 2 counted by the number of detection signals. The control circuit 13 determines that one detection signal is received in every change in combination of the high and low of the detection signal from the light receiving element 43a and the high and low of the detection signal from the light receiving element 43b. Hence, the reception interval between two successive detection signals is a time interval of change in combination of the high and low of the detection signal from the light receiving element 43a and the high and low of the detection signal from the light receiving element 43b. Further, as illustrated in the graphs 401 and 402, the output orders of detection signals of the respective light receiving elements are different between the forward rotation time and the backward rotation time. This results in different orders of changes in combination of the high and low of the detection signals from the respective light receiving elements. For this reason, the control circuit 13 can determine whether the DC motor 2 is rotating forward or rotating backward from the order of changes in combination of the high and low of the detection signals from the respective light receiving elements.

Figure 5A:
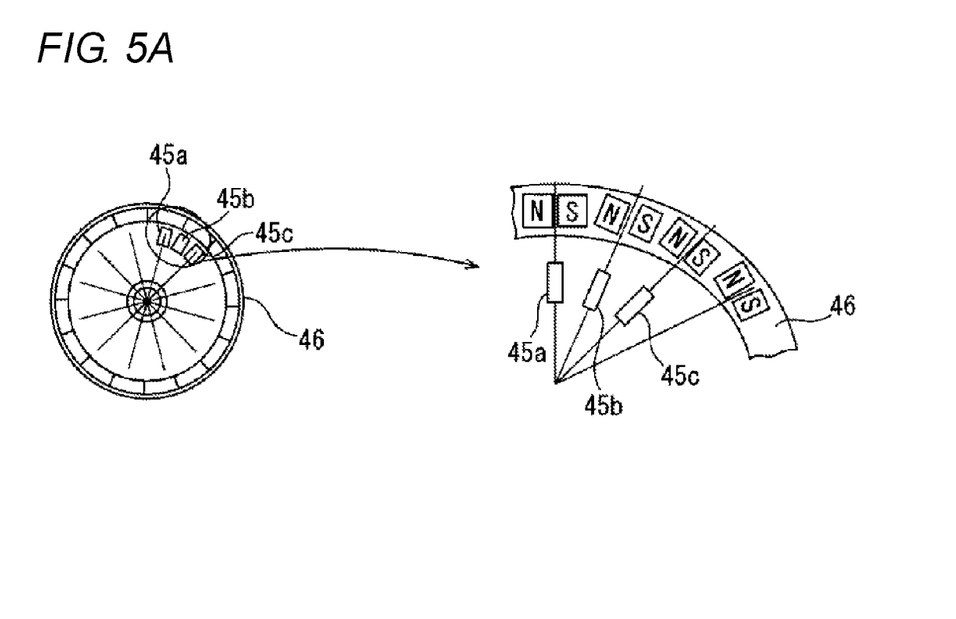
FIG. 5A is a schematic layout of a Hall sensor built in the DC motor, which is another example of the rotation angle sensor.

FIG. 5A is a schematic layout of the Hall sensor built in the DC motor 2, which is another example of the rotation angle sensor 4. In this case, the rotation angle sensor 4 includes three Hall sensors 45a, 45b, 45c disposed adjacent to a rotor 46 included in the DC motor 2. Note that each Hall sensor may be a Hall IC. The Hall sensors 45a, 45b, 45c are disposed as spaced from one another at a predetermined angle (e.g., 15° to 30°) along a direction of a circumference centered at a rotary shaft of the rotor 46. Then, each of the Hall sensors 45a, 45b, 45c detects a change in magnetic field due to passage of a pair of reversing magnetic poles, provided in the rotor 46, in the vicinity of the Hall sensor and outputs a pulse-shaped detection signal. In this case, the detection signal from the Hall sensor 45a (hereinafter referred to as a U-phase detection signal), the detection signal from the Hall sensor 45b (hereinafter referred to as a V-phase detection signal), and the detection signal from the Hall sensor 45c (hereinafter referred to as a W-phase detection signal) are outputted to the motor control device 1. However, when the Hall sensor is used as the rotation angle sensor 4, angular resolving power is typically lower than angular resolving power of the rotary encoder, and for example, in the example illustrated in FIG. 5A, 36 detection signals are outputted in every one revolution of the rotary shaft of the DC motor 2.

Figure 5B:
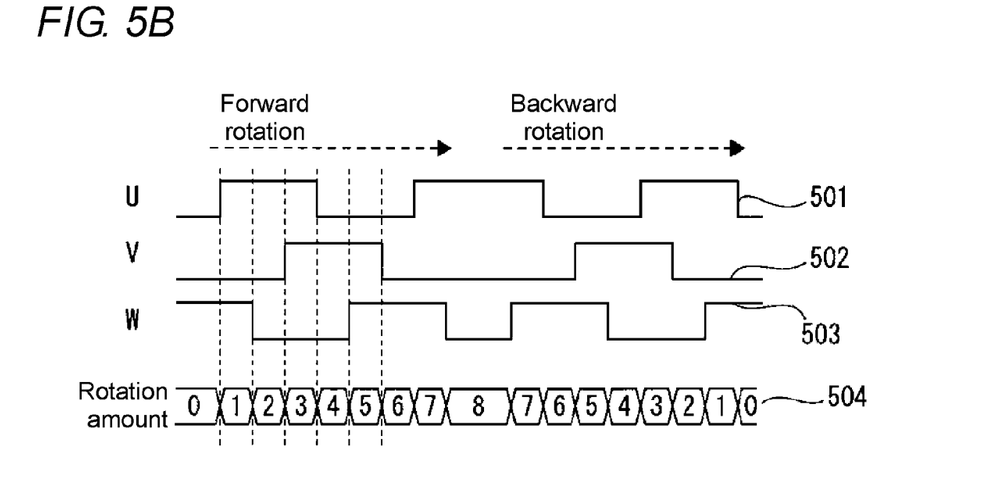
FIG. 5B is a timing chart for a detection signal outputted from the Hall sensor.

FIG. 5B is a timing chart for a detection signal outputted from the Hall sensor. In FIG. 5B, a horizontal axis represents time. Graphs 501 to 503 represent outputs from the Hall sensors 45a to 45c, respectively. A graph 504 represents a rotation amount of the DC motor 2 counted by the number of detection signals. The control circuit 13 determines that one detection signal is received in every change in combination of the high and low of the detection signals of the respective phases. Hence, the reception interval between two successive detection signals is the time interval of change in combination of the high and low of the detection signals of the respective phases. Further, as illustrated in the graphs 501 to 503, the output orders of the detection signals of the respective phases are different between the forward rotation time and the backward rotation time. This results in different orders of changes in combination of the high and low of the detection signals of the respective phases. For this reason, the control circuit 13 can determine whether the DC motor 2 is rotating forward or rotating backward from the order of changes in combination of the high and low of the detection signals of the respective phases.

Hereinafter, each unit of the motor control device 1 will be described.

The communication circuit 11 includes a communication interface 21 and a command analysis circuit 22, for example.

The communication interface 21 has an interface circuit for connecting between the upper-level control device and the motor control device 1. Note that the upper-level control device is, for example, a presentation CPU of a game machine mounted with the motor control device 1. The communication interface 21 receives from the upper-level control device a control command having a plurality of bits that are transmitted serially.

Further, the communication interface 21 receives from the upper-level control device an identification address for specifying the motor control device to be a controlled object of the control command. Moreover, in order to analyze the control command, the communication interface 21 may also receive from the upper-level control device a clock signal for synchronizing with each of the plurality of bits included in the control command. The clock signal can, for example, be a signal having a rectangular-shaped pulse for each predetermined number of bits in the control command.

When receiving the control command, the identification address, and the clock signal, the communication interface 21 outputs those to a command analysis circuit 22. Further, the communication interface 21 transmits to the upper-level control device an order completion signal and the like received from the command analysis circuit 22.

In every reception of the control command from the upper-level control circuit via the communication interface 21, the command analysis circuit 22 analyzes that control command. The command analysis circuit 22 then executes processing in accordance with the control command.

In the embodiment, there exist three kinds of control commands. An operation order being one of the control commands includes operation information for specifying operation of the DC motor 2, such as the target rotation amount of the DC motor 2 which corresponds to a moving amount of a movable body to be driven by the DC motor 2, and the target rotation speed of the DC motor 2. Further, a setting order being another one of the control commands includes setting information for defining a setting about the DC motor 2. Note that each of the operation information and the setting information is an example of control information for defining operation of the motor. Still another one of the control commands is a state reading order for making a request to read some or all pieces of the control information stored in the register 12 and to transmit the read information to the upper-level control device.

Figure 6:
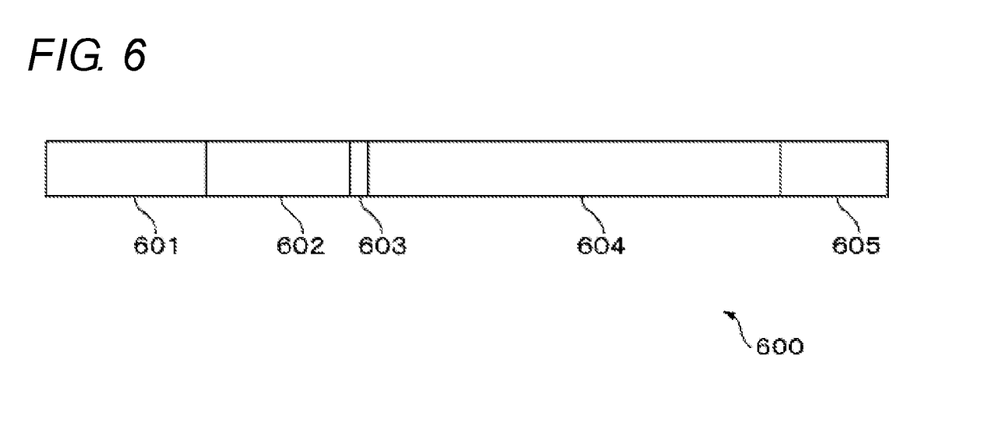
FIG. 6 is a diagram illustrating an example of a format of a control command.

FIG. 6 is a diagram illustrating an example of a format of the control command. As illustrated in FIG. 6, the control command 600 includes a START flag 601, a device address 602, a mode setting flag 603, control data 604, and an END flag 605 in this order from the head. Further, the control command 600 may include a one-bit spacer having a value of, for example, '0' between adjacent flags, addresses, and data.

The START flag 601 is a bit string representing the head of the control command 600, and in the embodiment, it is a bit string of successive nine bits each having a value of '1'. Note that the START flag 601 may simply be a bit string not matching any other arbitrary bit string in the control command 600.

The device address 602 is identification information for specifying the motor control device to be a controlled object of the control command 600. In the embodiment, the device address 602 is represented by a bit string having an eight-bit length. The device address 602 is subjected to determination by the command analysis circuit 22 of the communication circuit 11 as to whether or not it matches an identification address separately received from the upper-level control device. When it matches, the motor control device 1 is determined to be the control object of the control command 600.

The mode setting flag 603 is a two-bit flag representing the kind of the control command. The kind of the control command is shown based on combination of the bit values in the mode setting flag 603.

For example, when the value of the mode setting flag is '00', the control command is the operation order including the operation information. When the value of the mode setting flag is '01', the control command is the setting order including the setting information. When the value of the mode setting flag is '10', the control command is the state reading order.

The command analysis circuit 22 refers to the value of the mode setting flag 603 to specify the kind of the control command, and executes processing in accordance with that kind. Note that a detail of the processing of the command analysis circuit 22 will be described later.

When the control command is the operation order, the control data 604 includes operation information of the DC motor 2 controlled by the motor control device 1. For example, the control data 604 includes data representing a rotation direction, data representing a target rotation speed and data representing a target rotation amount. The data representing the target rotation speed includes 4 bits, for example, and the target rotation speed is set in 16 stages. When the control command is the setting order, the control data 604 includes, for example, a flag showing whether or not the current operation of the DC motor is to be suspended, data representing a set range of the speed, and data representing resolving power of the rotation angle of the DC motor 2 which is detected by the rotation angle sensor 4. Further, the control data 604 may include the maximum value of the actual rotation speed of the DC motor 2.

When the control command is the state reading order, the control data 604 includes address specifying information for specifying an address to be a reading target among addresses in the register 12. For example, the address specifying information is represented by a bit string with a predetermined length which occupies a predetermined position in the control data 604. Then, from values of the bit string which are the address specifying information, a range of control information to be a reading object is specified. For example, the address specifying information specifies any one of an address that stores some or all pieces of operation information of the operation order currently in execution, an address that stores some or all pieces of setting information related to the operation order currently in execution, an address that stores some or all pieces of operation information of an operation order in waiting (i.e., an operation order to be executed next), an address that stores the current position of the DC motor 2, and an address corresponding to all pieces of control information stored in the register 12.

The END flag 605 is a bit string representing the end of the control command 600. The END flag 605 may simply be a bit string not matching the START flag or the other bit strings included in the control command.

The command analysis circuit 22 compares the identification address with a device address included in the control command. When the identification address does not match the device address, the motor control device 1 is not a controlled object of the received control command, and hence, the command analysis circuit 22 discards that control command. On the other hand, when the identification address matches the device address, the command analysis circuit 22 determines that the motor control device 1 is a controlled object of that control command. The command analysis circuit 22 then executes processing in accordance with the kind of that control command.

Note that the command analysis circuit 22 may have a memory circuit for storing an identification address so as to determine whether or not the identification address matches the device address even when the identification address and the control command are received at different timings.

When the control command is the operation order or the setting order, the command analysis circuit 22 writes into the register 12 the control information included in the control command. Meanwhile, when the control command is the state reading order, the command analysis circuit 22 refers to the address specifying information included in the control data and specifies an address for reading some or all pieces of control information from the register 12. The command analysis circuit 22 then reads control information stored in the specified address in the register 12, and generates a response signal including the control information. Note that a response signal may include information for specifying a destination of the response signal, such as an address of the upper-level control device. Further, the response signal may further include information for specifying the motor control device 1, such as an identification address of the motor control device 1.

When generating a response signal, the command analysis circuit 22 transmits the response signal to the upper-level control device via the communication interface 21.

When one operation order about the DC motor 2 controlled by the motor control device 1, which is stored in the register 12, is executed, for example when the DC motor 2 rotates by a target rotation amount included in the operation order, the command analysis circuit 22 may generate an order completion signal showing that the operation order has been executed, and may transmit the order completion signal to the upper-level control device via the communication interface 21.

The register 12 has a memory circuit having a memory capacity capable of storing at least one of pairs of the setting information and the operation information of the DC motor 2. The memory circuit included in the register 12 is made of a volatile, readable and writable semiconductor memory circuit, for example.

The register 12 stores the setting information and the operation information written therein by the communication circuit 11. When the control circuit 13 reads the setting information and the operation information, the register 12 may delete the setting information and the operation information. Further, the register 12 may store information representing the current position of the movable body driven by the DC motor 2, such as a rotation amount of the DC motor 2 from one end of a movable range of the movable body.

When the command analysis circuit 22 of the communication circuit 11 makes a request of the register 12 to read control information, the register 12 reads control information stored in an address included in the request, and outputs the read control information to the command analysis circuit 22.

The control circuit 13 includes a processor and a non-volatile memory circuit, for example. The control circuit 13 refers to the operation information and the setting information read from the register 12, to decide the rotation direction of the DC motor 2. The control circuit 13 decides a duty ratio of the drive signal based on the operation information and the setting information. At this time, for example, the control circuit 13 may simply refer to a speed table representing a correspondence relation between the duty ratio and the value of the target rotation speed, previously stored in the memory circuit, to decide a duty ratio corresponding to the target rotation speed. Note that this duty ratio is an example of the set value of the rotation speed of the DC motor 2. The control circuit 13 then notifies the rotation direction and the duty ratio to the drive signal generation circuit 14.

Further, the control circuit 13 measures an actual rotation speed of the DC motor 2 based on the reception interval of detection signals received from the rotation angle sensor 4. The control circuit 13 then performs feedback-control on the rotation speed of the DC motor 2 so as to bring the actual rotation speed close to the target rotation speed. That is, when the actual rotation speed is lower than the target rotation speed, the control circuit 13 increases the duty ratio. On the contrary, when the actual rotation speed is higher than the target rotation speed, the control circuit 13 decreases the duty ratio.

In every execution of the operation order, after the DC motor 2 starts rotating by the execution of the operation order, the control circuit 13 counts the number of detection signals received from the rotation angle sensor 4, and takes a total of received detection signals as the total rotation amount of the DC motor 2. Then, the control circuit 13 writes the total rotation amount (i.e., the current position of the DC motor 2 or the movable body driven by the DC motor 2) into the register 12.

In every update of the total rotation amount of the DC motor 2, the control circuit 13 calculates as a remaining rotation amount a difference between the total rotation amount and the target rotation amount included in the operation order. The control circuit 13 then regulates the duty ratio based on the remaining rotation amount such that the DC motor 2 rests at the point in time when the DC motor 2 rotates by the target rotation amount specified by the operation order. For example, when the remaining rotation amount becomes a predetermined value or lower, the control circuit 13 may decrease the duty ratio with decrease in remaining rotation amount. At the point in time when the remaining rotation amount becomes 0, the control circuit 13 sets the duty ratio to 0.

When the total rotation amount reaches the target rotation amount, the control circuit 13 notifies to the command analysis circuit 22 of the communication circuit 11 that the execution of the operation order has been completed. The control circuit 13 then deletes from the register 12 the control information concerning the operation order, the execution of which has been completed.

A terminal for switching the rotation angle sensor is further provided in the control circuit 13. When, for example, a relatively high predetermined voltage is applied to this terminal, the control circuit 13 determines that the rotary encoder is to be used as the rotation angle sensor 4. On the other hand, when, for example, a relatively low predetermined voltage is applied to the terminal for switching the rotation angle sensor, the control circuit 13 determines that the Hall sensor is to be used as the rotation angle sensor 4.

The control circuit 13 measures an actual rotation speed of the DC motor 2 in accordance with the type of the rotation angle sensor to be used and the reception interval of detection signals. Note that a detail of measurement of the actual rotation speed will be described later.

The drive signal generation circuit 14 includes, for example, a variable pulse generation circuit capable of changing a width of an outputted pulse, and a switch circuit for switching which of the switches in motor drive circuit 3 a periodic pulse signal being the drive signal is outputted to. Then, in accordance with the duty ratio notified from the control circuit 13, the drive signal generation circuit 14 generates a drive signal for driving the DC motor 2 according to the PWM technique, and outputs the drive signal to any of the switches in the motor drive circuit 3. Note that a length of one period of the drive signal is 50 μsec, for example. For example when the rotation direction notified from the control circuit 13 is the forward rotation, the drive signal generation circuit 14 outputs a periodic pulse signal to each of the switches TR1 and TR4 in the motor drive circuit 3. On the other hand, when the rotation direction notified from the control circuit 13 is the backward rotation, the drive signal generation circuit 14 outputs a periodic pulse signal to each of the switches TR2 and TR3 in the motor drive circuit 3.

The sensor interface circuit 15 has an interface circuit for receiving a detection signal from the rotation angle sensor 4. In every reception of a detection signal, the sensor interface circuit 15 outputs the detection signal to the control circuit 13. In the embodiment, the sensor interface circuit 15 can be connected to any of the rotary encoder and the Hall sensor.

For this reason, the sensor interface circuit 15 may separately have two input terminals (for the A phase and the B phase) for the rotary encoder and three input terminals (for the U phase, the V phase, and the W phase) for the Hall sensor. In this case, when the rotary encoder is used as the rotation angle sensor 4, detection signals from the respective light receiving elements included in the rotary encoder may simply be inputted via the input terminals for the rotary encoder. When the Hall sensor is used as the rotation angle sensor 4, detection signals from the respective Hall sensors may simply be inputted via the input terminals for the Hall sensor.

Further, the sensor interface circuit 15 may include three input terminal to be shared by the rotary encoder and the Hall sensor. In this case, when the rotary encoder is used as the rotation angle sensor 4, detection signals from the respective light receiving elements included in the rotary encoder may simply be inputted via two input terminals previously specified as ones for the rotary encoder among the three input terminals.

Hereinafter, the measurement of the actual rotation speed by the control circuit 13 will be described. In the embodiment, whichever of the rotary encoder or the Hall sensor is used as the rotation angle sensor 4, one common speed measurement table is used which represents the relation between the rotation speed and the reception interval of two successive detection signals. When the Hall sensor with relatively low angular resolving power is used as the rotation angle sensor 4, the control circuit 13 corrects the reception interval corresponding to each individual rotation speed in the speed measurement table.

Figure 7:
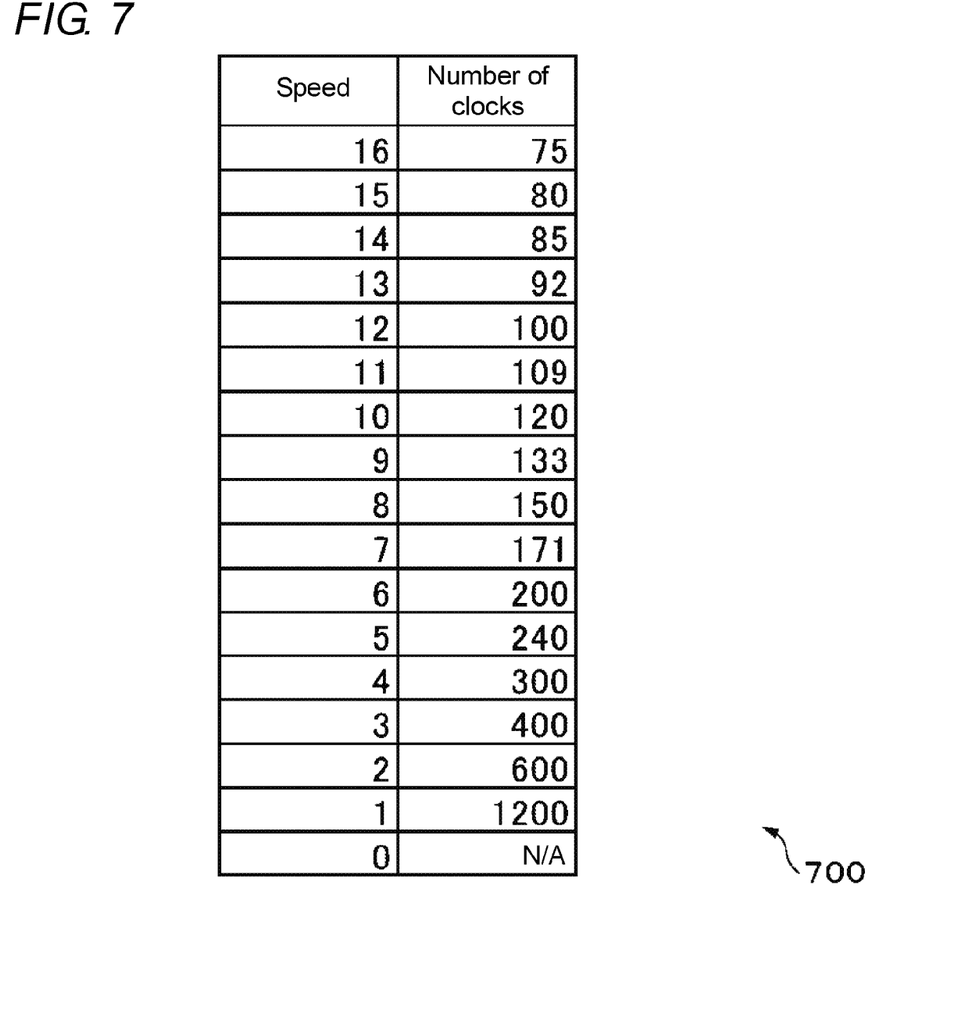
FIG. 7 is an example of a speed measurement table.

FIG. 7 is an example of the speed measurement table. Each field in the left column of a speed measurement table 700 shows a set value of the rotation speed of the DC motor 2 which is set in any of 17 stages. In this example, the rotation speed is set in the 17 stages, and among them, each of set values '1' to '16' corresponds to a set value of the target rotation speed included in the control command. Meanwhile, the set value '0' represents that the DC motor 2 has been stopped. Each field on the right column in the speed measurement table 700 shows a reception interval of detection signals which corresponds to the set value of the rotation speed on the same row. Note that the reception interval is shown by the number of counts of clocks used in the control circuit 13. For example, when the number of clocks in the reception interval of two successive detection signals is 75, the actual rotation speed is determined to be '16'. When the number of clocks in the reception interval of two successive detection signals is 1200, the actual rotation speed is determined to be '1'. That is, the larger the number of clocks in the reception interval of two successive detection signals, the lower the actual rotation speed.

Even when the rotation speed of the DC motor 2 is fixed, the time interval from a change in high and low of the A-phase detection signal to a change in high and low of the B-phase detection signal may be different from the time interval from the change in high and low of the B-phase detection signal to the next change in high and low of the A-phase detection signal, depending on placement of the two light receiving elements of the rotary encoder. This results in that two successive reception intervals of detection signals are not the same. Then, the control circuit 13 may simply average the number of clocks concerning two successive reception intervals of detection signals and may obtain as the actual rotation speed a set value of a rotation speed corresponding to the average value with reference to the speed measurement table.

Similarly, when the Hall sensor is used as the rotation angle sensor 4, the three Hall sensors may not be disposed at regular intervals. In such a case, even when the rotation speed of the DC motor 2 is fixed, there may be a difference among the time interval from a change in high and low of the U-phase detection signal to a change in high and low of the V-phase detection signal, the time interval from the change in high and low of the V-phase detection signal to a change in high and low of the W-phase detection signal, and the time interval from the change in high and low of the W-phase detection signal to the next change in high and low of the U-phase detection signal. Then, the control circuit 13 may simply average the number of clocks concerning the three successive reception intervals of detection signals and may obtain as the actual rotation speed a set value of a rotation speed corresponding to the average value with reference to the speed measurement table. In order to reduce a computation amount at the time of the averaging processing, the control circuit 13 may divide a sum of the numbers of clocks concerning the three successive reception intervals of detection signals by 4, to calculate an approximate average value. In this case, the reception interval value in the speed measurement table is also corrected so as to correspond to the approximate average value.

Next, a description will be given of the correction of the reception interval value in the speed measurement table.

In the embodiment, the speed measurement table is set such that, when the rotation speed becomes the highest, the reception interval between two successive detection signals of the rotary encoder becomes a predetermined number of clocks (e.g., 75 clocks). Further, a clock oscillation period depends on an oscillation circuit that is included in the control circuit 13 or supplies a clock to the control circuit 13. The clock oscillation period is fixed. With decrease in rotation speed corresponding to the fastest set value '16' of the rotation speed, or with decrease in angle resolution of the rotation angle sensor, the control circuit 13 corrects the reception interval value so as to increase the number of clocks in the reception interval which corresponds the set value of each individual rotation speed in the speed measurement table. Hence, the control circuit 13 calculates a correction reference value to be a reference for the correction of the reception interval based on an actual rotation speed corresponding to the fastest set value of the rotation speed, a reception interval between two successive detection signals, and a clock oscillation period.

For example, the correction reference value with respect to the rotary encoder is calculated in accordance with the following formula.

Mathematical Formula 1

$$S = 256 - \frac{60 \times fxt}{Cmax \times pr \times N} \quad (1)$$

Cmax is the number of clocks in the reception interval which corresponds to the fastest set value '16' of the rotation speed. Note that Cmax is set to a value being large to some degree, e.g., 75 clocks, such that the number of clocks in the reception interval for each rotation speed set value becomes a different value. pr is angular resolving power of the rotary encoder, e.g., 1000 pls/rot. N is a rotation speed [rpm] of the DC motor 2 which corresponds to the fastest set value ('16' in the example illustrated in FIG. 7) of the rotation speed. fxt is a clock oscillation period [Hz], e.g., 4096 KHz. S is the correction reference value.

Also with respect to the Hall sensor, when an actual rotation speed is to be measured based on an average value of the number of clocks of three successive reception intervals of detection signals, the control circuit 13 may simply calculate the correction reference value S in accordance with Formula (1). In this case, a value of angular resolving power of the Hall sensor is used as pr. However, when the actual rotation speed is to be measured based on an approximate average value obtained by dividing a sum of the number of clocks of three successive reception intervals of detection signals by 4, the control circuit 13 calculates the correction reference value S in accordance with the next formula in order to compensate a difference between the number of clocks due to the approximation.

Mathematical Formula 2

$$S = 256 - \frac{60 \times fxt}{(4/3)Cmax \times pr \times N} = 256 - \frac{45 \times fxt}{Cmax \times pr \times N} \quad (2)$$

In accordance with the next formula, the control circuit 13 corrects the reception interval value corresponding to the set value of each individual rotation speed in the speed measurement table.

Mathematical Formula 3

$$C'_j = (256 - S)C_j \quad (3)$$

Cj (j=0, 1, . . . , 16) is a reception interval value in the original speed measurement table with respect to a speed set value j. C'j is a reception interval value in the speed measurement table after correction with respect to the speed set value j. For example, when the correction reference value S is 240, C'j becomes 12 times as large as Cj. For example, in the speed measurement table 700 illustrated in FIG. 7, the reception interval value after correction with respect to the speed set value '16' is 1200.

In this manner, the lower the rotation speed N of the DC motor 2 which corresponds to the fastest set value of the rotation speed, or the smaller the angular resolving power pr, the smaller the correction reference value S, and as a result, the larger the reception interval value corresponding to the set value of each individual rotation speed in the speed measurement table.

Note that the correction reference value S in the case of using the rotary encoder and the correction reference value S in the case of using the Hall sensor may each be previously stored into the non-volatile memory included in the control circuit 13. In accordance with an input from the terminal for switching the rotation angle sensor, the control circuit 13 may simply read the correction reference value S of the sensor to be used out of the rotary encoder and the Hall sensor, which is shown by the input, and input the read value into Formula (3) to correct the speed measurement table.

In this manner, whichever of the rotary encoder or the Hall sensor is used as the rotation angle sensor, the control circuit 13 can measure the actual rotation speed of the DC motor 2 through use of one speed measurement table. Hence, the control circuit 13 can suppress an increase in circuit scale.

As described above, this motor control device can measure a rotation angle of the DC motor, whichever of the rotary encoder or the Hall sensor is used as the rotation angle sensor for detecting the rotation amount of the DC motor.

Note that the present invention is not restricted to the above embodiment. According to a modified example, the motor control device 1 may receive a detection signal from both the rotary encoder and the Hall sensor. In this case, the rotation angle sensor to be used for measuring the actual rotation speed of the DC motor 2 may be selected in accordance with the target rotation speed or the actual rotation speed of the DC motor 2.

The lower the actual rotation speed of the DC motor 2, the longer the reception interval of the detection signal. When the reception interval of detection signals is excessively long, the time interval also becomes long at the time of reflecting the measured value of the actual rotation speed to the feedback control of the rotation speed of the DC motor 2. This results in preventing the DC motor 2 from operating smoothly. Therefore, when the actual rotation speed of the DC motor 2 is low, the rotary encoder with relatively high angular resolving power is preferably used as the rotation angle sensor 4. On the contrary, the higher the actual rotation speed of the DC motor 2, the smaller the number of clocks per reception interval of detection signals. For this reason, when the actual rotation speed is excessively high, a difference in number of clocks in the reception interval for each set value of the rotation speed becomes the interval of clocks or smaller. This makes it difficult to accurately measure the actual rotation speed. Therefore, when the actual rotation speed of the DC motor 2 is high, the Hall sensor with relatively low angular resolving power is preferably used as the rotation angle sensor 4.

For example, when the number of clocks in the reception interval of two successive detection signals received from the rotary encoder is not larger than a predetermined number, the actual rotation speed is estimated to be not higher than a predetermined speed. The control circuit 13 measures an actual rotation speed of the DC motor 2 based on the detection signal from the Hall sensor. Meanwhile, when the number of clocks in the reception interval of two successive detection signals received from the rotary encoder is larger than a predetermined number, the actual rotation speed is estimated to higher than the predetermined speed. The control circuit 13 measures an actual rotation speed of the DC motor 2 based on the detection signal from the rotary encoder. Hence, the control circuit 13 can select an appropriate rotation angle sensor in accordance with the rotation speed of the DC motor 2. Note that the number of clocks in the reception interval of two successive detection signals is an example of indexes representing the actual rotation speed of the DC motor 2. Further, the predetermined number is set to such a value that a difference in number of clocks in the reception interval of two successive speed set values (e.g., speed set values '16' and '15') is larger than 1, e.g., 75 clocks.

According to a modified example, the control circuit 13 switches the rotation angle sensor used in measurement of the actual rotation speed in accordance with the target rotation speed set in the control command. For example, when the target rotation speed is not smaller than a predetermined speed threshold, the actual rotation speed is estimated to be higher than the predetermined speed. In this case, the control circuit 13 may measure the actual rotation speed of the DC motor 2 based on the detection signal from the Hall sensor. On the other hand, when the target rotation speed is smaller than the predetermined speed threshold, the control circuit 13 may measure the actual rotation speed of the DC motor 2 based on the detection signal from the rotary encoder. Note that the above predetermined number or speed threshold may be specified by the control command. Even when the rotation angle sensor used for measuring the actual rotation speed is automatically switched in accordance with the rotation speed, in order to simplify management of a total rotation amount, the total rotation amount is preferably calculated based on the number of counts of detection signals from either of the rotation angle sensors.

The motor control device according to the above embodiment or modified example may be mounted in a game machine such as a slot game machine or a pinball game machine.

Figure 8:
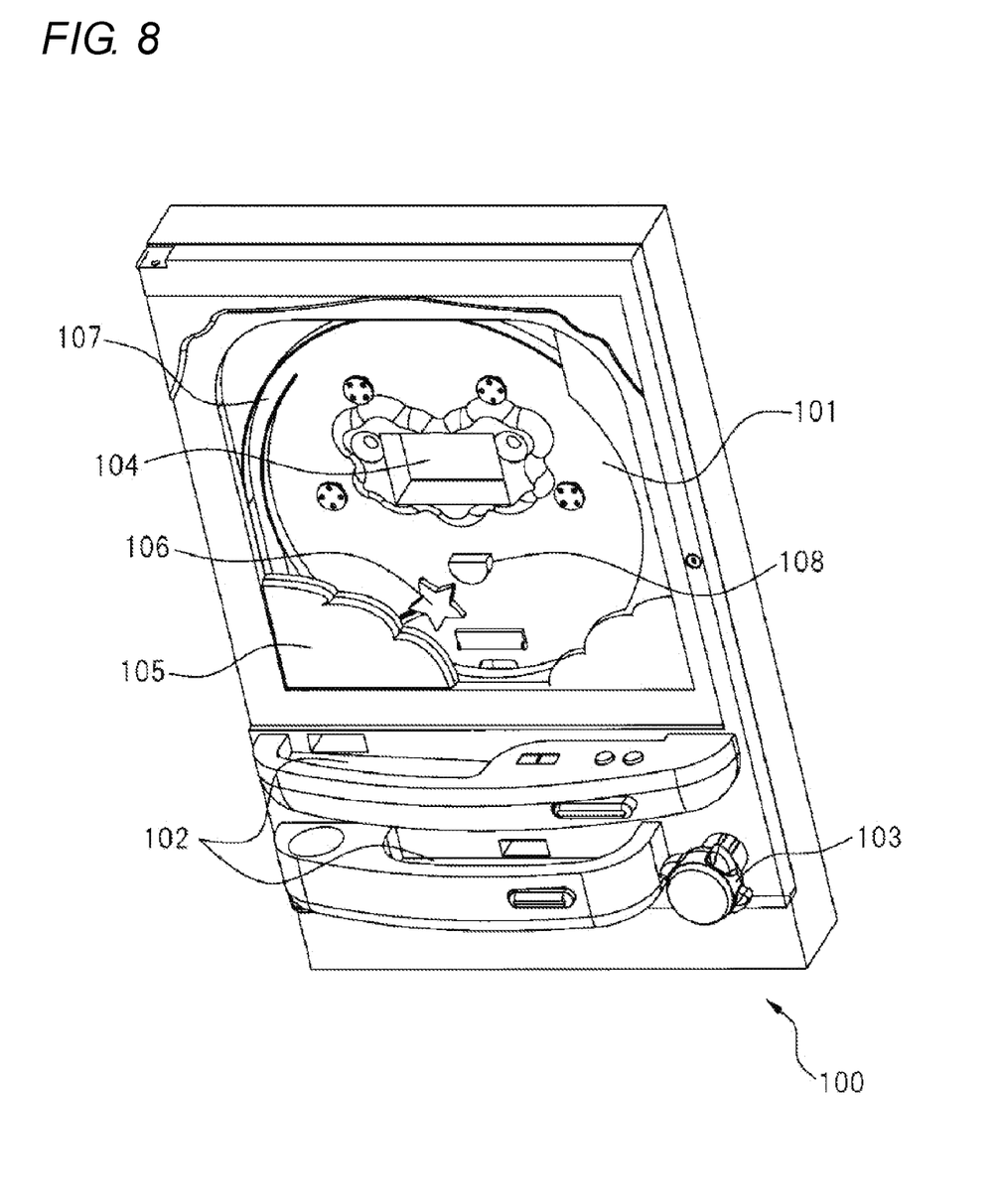
FIG. 8 is a schematic perspective view of a pinball game machine provided with a motor control device according to one embodiment or modified example of the present invention.
Figure 9:
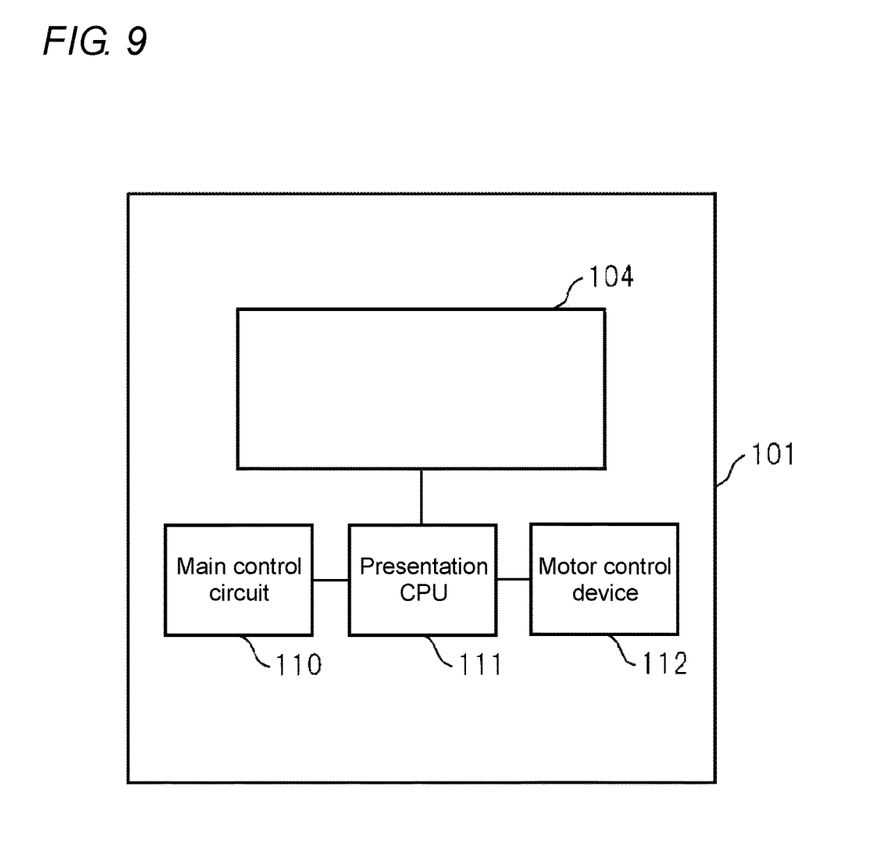
FIG. 9 is a schematic rear view of the pinball game machine provided with the motor control device according to one embodiment or modified example of the present invention.

FIG. 8 is a schematic perspective view of a pinball game machine 100 provided with the motor control device according to the above embodiment or modified example. FIG. 9 is a schematic rear view of the pinball game machine 100. As illustrated in FIG. 8, the pinball game machine 100 includes a game board 101 which is provided from the top portion to most part of the central portion and is the game machine body, a ball receptor 102 disposed below the game board 101, an operating unit 103 provided with a handle, and a display device 104 provided in substantially the center of the game board 101.

For presentation of a game, the pinball game machine 100 includes, on the front surface of the game board 101, a fixed accessory 105 disposed below the game board 101, and a movable accessory 106 disposed between the game board 101 and the fixed accessory 105. A rail 107 is provided at the side of the game board 101. A large number of obstacle spikes (not illustrated) and at least one prize winning device 108 are provided on the game board 101.

The operating unit 103 launches a game ball by predetermined force from a launch device, not illustrated, in accordance with a rotation amount of the handle by operation of the player. The launched game ball moves upward along the rail 107 and falls among a large number of obstacle spikes. When a sensor, not illustrated, detects that the game ball enters any of the prize winning devices 108, a main control circuit 110 provided on the rear surface of the game board 101 discharges the game ball to the ball receptor 102 via a ball dispenser (not illustrated) for putting out a predetermined number of game balls in accordance with the prize winning device 108 where the game ball has entered. Further, the main control circuit 110 causes the display device 104 to display a variety of images via a presentation CPU 111 provided on the rear surface of the game board 101.

The movable accessory 106 is an example of the movable body that moves in accordance with a state of a game. The movable accessory 106 is driven by a DC motor (not illustrated) provided on the rear surface of the game board 101 and controlled by a motor control device 112.

On the basis of a state signal representing a state of a game and transmitted from the main control circuit 110 to the presentation CPU 111, the presentation CPU 111 decides target coordinates and a moving speed of the movable accessory 106, and generates a control command in accordance with the decision. The presentation CPU 111 then outputs the generated control command to the motor control device 112. For example, before entry of the game ball into the prize winning device 108, the presentation CPU 111 transmits to the motor control device 112 a control command for specifying as a target rotation amount a rotation amount of the DC motor, which correspond to a movement distance of the movable accessory 106 from the current position to the lower left end of a movable range such that the fixed accessory 105 hides the movable accessory 106. Meanwhile, when the entry of the game ball into the prize winning device 108 is detected and a state signal showing the detection is inputted from the main control circuit 110 into the presentation CPU 111, the presentation CPU 111 generates a control command for specifying as a target rotation amount a rotation amount of the DC motor, which correspond to a movement distance of the movable accessory 106 from the current position to the upper right end of the movable range, and transmits the control command to the motor control device 112.

The motor control device 112 is a motor control device according to the above embodiment or its modified example. On the basis of the control command received from the presentation CPU 111 and a reception interval of detection signals received from the rotation angle sensor (not illustrated), the motor control device 112 controls the DC motor such that the DC motor rotates at the target rotation speed (i.e., the movable accessory 106 moves at a speed in accordance with the target rotation speed) and stops when it has rotated by the target rotation amount (i.e., when the movable accessory 106 has reached a target place). Hence, the movable accessory 106 can accurately move to the target place in accordance with the presentation. Further, the rotation angle sensor may be either the rotary encoder or the Hall sensor, or both of those sensors.

As thus described, a person skilled in the art can make a variety of changes in accordance with a mode that is executed in the scope of the present invention.

The invention claimed is:

1. A motor control device for controlling a motor, the device comprising:
   a communication interface configured to receive from an external device a control command for defining a target rotation amount and a target rotation speed of the motor;
   a sensor interface configured to be connected with any of a first rotation angle sensor for outputting a first detection signal in every rotation of the motor at a first angle and a second rotation angle sensor for outputting a second detection signal in every rotation of the motor at a second angle that is larger than the first angle;
   a controller configured to obtain a measured value of a rotation speed of the motor based on a reception interval of first detection signals or a reception interval of second detection signals, and configured to decide a set value of the rotation speed of the motor so as to bring the measured value close to the target rotation speed; and
   a drive signal generator configured to generate a drive signal for rotating the motor in accordance with the set value of the rotation speed, and configured to output the drive signal.

2. The motor control device according to claim 1, further comprising
   a terminal configured to be inputted with a signal representing which of the first rotation angle sensor and the second rotation angle sensor is to be connected, wherein
   the controller obtains the measured value based on the reception interval of the first detection signals when the signal shows that the first rotation angle sensor is to be connected, while the controller obtains the measured value based on the reception interval of the second detection signals when the signal shows that the second rotation angle sensor is to be connected.

3. The motor control device according to claim 1, wherein in the case of obtaining the measured value based on the second detection signal, the controller changes the reception interval corresponding to each individual rotation speed in a speed measurement table, which represents a relation between the reception interval of the first detection signals and the rotation speed of the motor, in accordance with the reception interval of the second detection signals at a predetermined rotation speed to correct the speed measurement table, and obtains the measured value based on the corrected speed measurement table and the reception interval of the second detection signals.

4. The motor control device according to claim 1, wherein the sensor interface receives both the first detection signal and the second detection signal, and
   the controller obtains the measured value based on the reception interval of the first detection signals when the measured value is estimated to be not higher than a predetermined speed in accordance with the target rotation speed or an index representing the measured value, while the controller obtains the measured value based on the reception interval of the second detection signals when the measured value is estimated to be higher than the predetermined speed.

5. A game machine comprising:
   a game machine body;
   a movable body movably disposed on a front surface of the game machine body;
   a motor configured to drive the movable body;
   a rotation angle sensor that is any of a first rotation angle sensor for outputting a first detection signal in every rotation of the motor at a first angle and a second rotation angle sensor for outputting a second detection signal in every rotation of the motor at a second angle that is larger than the first angle;
   a motor control device configured to control the motor; and
   a presentation controller configured to control presentation in accordance with a state of a game, wherein
   the presentation controller generates a control command for defining a target rotation amount and a target rotation speed of the motor in accordance with the state of the game, and transmits the control command to the motor control device, and
   the motor control device is the motor control device according to claim 1.

6. A game machine comprising:
   a game machine body;
   a movable body movably disposed on a front surface of the game machine body;
   a motor configured to drive the movable body;
   a rotation angle sensor that is any of a first rotation angle sensor for outputting a first detection signal in every rotation of the motor at a first angle and a second rotation angle sensor for outputting a second detection signal in every rotation of the motor at a second angle that is larger than the first angle;
   a motor control device configured to control the motor; and
   a presentation controller configured to control presentation in accordance with a state of a game, wherein
   the presentation controller generates a control command for defining a target rotation amount and a target rotation speed of the motor in accordance with the state of the game, and transmits the control command to the motor control device, and
   the motor control device is the motor control device according to claim 2.

7. A game machine comprising:
   a game machine body;
   a movable body movably disposed on a front surface of the game machine body;
   a motor configured to drive the movable body;
   a rotation angle sensor that is any of a first rotation angle sensor for outputting a first detection signal in every rotation of the motor at a first angle and a second rotation angle sensor for outputting a second detection signal in every rotation of the motor at a second angle that is larger than the first angle;
   a motor control device configured to control the motor; and
   a presentation controller configured to control presentation in accordance with a state of a game, wherein
   the presentation controller generates a control command for defining a target rotation amount and a target rotation speed of the motor in accordance with the state of the game, and transmits the control command to the motor control device, and
   the motor control device is the motor control device according to claim 3.

8. A game machine comprising:
a game machine body;
a movable body movably disposed on a front surface of the game machine body;
a motor configured to drive the movable body;
a rotation angle sensor that is any of a first rotation angle sensor for outputting a first detection signal in every rotation of the motor at a first angle and a second rotation angle sensor for outputting a second detection signal in every rotation of the motor at a second angle that is larger than the first angle;
a motor control device configured to control the motor; and
a presentation controller configured to control presentation in accordance with a state of a game,
wherein
the presentation controller generates a control command for defining a target rotation amount and a target rotation speed of the motor in accordance with the state of the game, and transmits the control command to the motor control device, and
the motor control device is the motor control device according claim 4.

\* \* \* \* \*